(12) United States Patent
Hokenek et al.

(10) Patent No.: US 6,904,511 B2
(45) Date of Patent: Jun. 7, 2005

(54) METHOD AND APPARATUS FOR REGISTER FILE PORT REDUCTION IN A MULTITHREADED PROCESSOR

(75) Inventors: Erdem Hokenek, Yorktown Heights, NY (US); Mayan Moudgill, White Plains, NY (US); C. John Glossner, Carmel, NY (US)

(73) Assignee: Sandbridge Technologies, Inc., White Plains, NY (US)

( * ) Notice: Subject to any disclaimer, the term of this patent is extended or adjusted under 35 U.S.C. 154(b) by 147 days.

(21) Appl. No.: 10/269,373

(22) Filed: Oct. 11, 2002

(65) Prior Publication Data
US 2004/0073779 A1 Apr. 15, 2004

(51) Int. Cl.$^7$ .................. G06F 15/167; G06F 12/02; G06F 13/16; G06F 9/54
(52) U.S. Cl. .................. 712/26; 712/219; 712/228; 712/248; 711/138; 711/153; 711/173; 718/108
(58) Field of Search .................. 712/26, 219, 228, 712/248, 23, 215; 711/138, 153, 173; 718/108; 719/314; 717/149

(56) References Cited

U.S. PATENT DOCUMENTS

| | | | |
|---|---|---|---|
| 5,226,131 A | * 7/1993 | Grafe et al. | ............. 712/201 |
| 5,404,469 A | * 4/1995 | Chung et al. | ............. 712/215 |
| 5,649,135 A | 7/1997 | Pechanek et al. | |
| 5,659,785 A | 8/1997 | Pechanek et al. | |
| 5,682,491 A | 10/1997 | Pechanek et al. | |
| 6,038,643 A | * 3/2000 | Tremblay et al. | ........... 711/132 |
| 6,073,159 A | * 6/2000 | Emer et al. | ............. 718/103 |
| 6,079,010 A | 6/2000 | D'Arcy et al. | |
| 6,128,641 A | * 10/2000 | Fleck et al. | ............. 718/108 |
| 6,128,720 A | 10/2000 | Pechanek et al. | |
| 6,230,251 B1 | 5/2001 | Batten et al. | |
| 6,256,725 B1 | 7/2001 | Batten et al. | |
| 6,260,189 B1 | 7/2001 | Batten et al. | |
| 6,269,437 B1 | 7/2001 | Batten et al. | |
| 6,282,585 B1 | 8/2001 | Batten et al. | |
| 6,317,821 B1 | 11/2001 | Batten et al. | |
| 6,341,347 B1 | * 1/2002 | Joy et al. | ................. 712/228 |
| 6,643,747 B2 | * 11/2003 | Hammarlund et al. | ....... 711/151 |

OTHER PUBLICATIONS

C. J. Glossner, "The Delft–Java Engine," Doctoral Thesis, Delft University of Technology, Netherlands, Nov. 5, 2001.
"Basic Features of the HEP Supercomputer," http://www-ee.eng.hawaii.edu/~nava/HEP/introduction.html, pp. 1–2.
"The MOVE Concept," http://ce.et.tudelft.nl/MOVE/section3.2.html, pp. 1–2.
"Simultaneous Multithreading Project," http://www.cs.washington.edu/research/ smt/index.html, pp. 1–7.
"Introduction to Multithreading, Superthreading and Hyperthreading," http://arstechnica.com/paedia/h/hyperthreading/hyperthreading–1.html, pp. 1–5.
"Basic Features of the HEP Supercomputer," www-ee.eng.hawaii.edu/~nava/HEP/introduction.html, pp. 1–2.
"The MOVE Concept," ce.et.tudelft.nl/MOVE/section3.2.html, pp. 1–2.
"Simultaneous Multithreading Project," www.cs.washington.edu/research/ smt/index.html, pp. 1–7.
"Introduction to Multithreading, Superthreading and Hyperthreading," arstechnica.com/paedia/h/hyperthreading/hyperthreading–1.html, pp. 1–5.

\* cited by examiner

*Primary Examiner*—Daniel H. Pan
(74) *Attorney, Agent, or Firm*—Ryan, Mason & Lewis, LLP

(57) ABSTRACT

Techniques for thread-based register file access by a multithreaded processor are disclosed. The multithreaded processor determines a thread identifier associated with a particular processor thread, and utilizes at least a portion of the thread identifier to select a particular portion of an associated register file to be accessed by the corresponding processor thread. In an illustrative embodiment, the register file is divided into even and odd portions, with a least significant bit or other portion of the thread identifier being used to select either the even or the odd portion for use by a given processor thread. The thread-based register file selection may be utilized in conjunction with token triggered threading and instruction pipelining. Advantageously, the invention reduces register file port requirements and thus processor power consumption, while maintaining desired levels of concurrency.

20 Claims, 5 Drawing Sheets

| | | | | | | | | | |
|---|---|---|---|---|---|---|---|---|---|
| Ld/St | INST DEC | RF READ | AGEN | XFER | INT EXT | MEM 0 | MEM 1 | MEM 2 | WB |
| ALU | INST DEC | RF READ | EXEC1 | EXEC2 | XFER | WB | | | |
| I_Mul | INST DEC | RF READ | EXEC1 | EXEC2 | EXEC3 | XFER | WB | | |
| V_Mul | INST DEC | RF READ | MPY1 | MPY2 | ADD1 | ADD2 | XFER | WB | |

| THREAD | EACH THREAD ISSUES LD & V_MUL PER CYCLE | |
|---|---|---|
| 1 | D R A X I M M M W̄ᵉ<br>D R M M A A X W | e |
| 2 | D R A X I M M M W<br>D R M M A A X W̄ᵒ | o |
| 3 | D R A X I M M M W<br>D R M M A A X W | e |
| 4 | D R A X I M M M W<br>D R M M A A X W | o |
| 1 | D R A X I M M M W<br>D R M M A A X W | e |
| 2 | D R A X I M M M W<br>D R M M A A X W | o |
| 3 | D R A X I M M M W<br>D R M M A A X W | e |
| 4 | D R A X I M M M W<br>D R M M A A X W | o |
| 1 | D R A X I M M M W<br>D R M M A A X W | e |
| 2 | D R A X I M M M W<br>D R M M A A X W | o |
| 3 | D R A X I M M M W<br>D R M M A A X W | e |
| 4 | D R A X I M M M W<br>D R M M A A X W | o |

FIG. 7

METHOD AND APPARATUS FOR REGISTER FILE PORT REDUCTION IN A MULTITHREADED PROCESSOR

RELATED APPLICATION(S)

The present invention is related to the inventions described in U.S. patent applications Ser. No. 10/269,247, entitled "Method and Apparatus for Thread-Based Memory Access in a Multithreaded Processor," Ser. No. 10/269,372, entitled "Multithreaded Processor With Efficient Processing For Convergence Device Applications," and Ser. No. 10/269,245, now U.S. Pat. No. 6,842,848, entitled "Method and Apparatus for Token Triggered Multithreading," all of which are filed concurrently herewith and incorporated by reference herein.

FIELD OF THE INVENTION

The present invention relates generally to the field of digital data processors, and more particularly to register file access techniques in a multithreaded processor.

BACKGROUND OF THE INVENTION

Storage spaces in a computer system or other processor-based system are typically partitioned into memory and registers. Conventional register file configurations are described in, for example, M. J. Flynn, "Computer Architecture: Pipelined and Parallel Processor Design," Jones and Bartlett Publishers, Boston, Mass., 1995, and G. A. Blaauw and Frederick P. Brooks, "Computer Architecture: Concepts and Evolution," Addison-Wesley, Reading, Mass., 1997, both of which are incorporated by reference herein.

A given register file may be a so-called "general purpose" register file, which typically refers to a register file utilizable for storage of intermediate or otherwise temporary results associated with multiple instruction functions within the processor. Historically, only one instruction would be actively accessing a general purpose register file per processor cycle, such that the number of required register ports was minimal. However, modem processors typically have many instructions active in a given processor cycle, and thus multiple register file accesses per processor cycle. For example, a multithreaded processor provides high concurrency through simultaneous execution of multiple distinct instruction sequences or "threads," with temporary results being stored in register files.

These and other similar arrangements in modern processors can result in a substantial increase in the "port pressure," that is, the number of required register file ports. Unfortunately, a significant problem associated with register file port pressure is that an increase in the number of register file ports also substantially increases the power dissipation of the processor. Typically, the power consumption associated with register file ports is primarily attributable to the write ports of the register file.

An example of a modern processor which includes a general purpose register file is the Texas Instruments (TI) C64x, described in the TMS320C6000 CPU and Instruction Set Reference Guide, SPRZ168B, www-s.ti.com/sc/psheets/sprz168b/sprz168b.pdf, which is incorporated by reference herein. The TI C64x utilizes a type of Very Long Instruction Word (VLIW) architecture in which up to eight instructions per cycle can issue, with one instruction controlling one execution unit of the processor. The processor register file includes 64 registers. Configuring the C64x such that each instruction can access all 64 registers requires 26 read ports and 18 write ports, for a total of 44 ports. However, since such an arrangement is intractable, the designers of the C64x instead decided to split the register file access in half, thereby placing restrictions on the programmer, while dividing the ports between the two halves. Nonetheless, the C64x still requires a total of 44 ports.

Reducing port pressure is thus an important aspect of modern processor design, particularly for multithreaded processors and other processors in which many instructions may be active in a given processor cycle. A need exists in the art for techniques for providing reductions in port pressure, so as to decrease processor power consumption, without impacting the desired level of concurrency.

SUMMARY OF THE INVENTION

The present invention provides an improved register file configuration and associated thread-based register file selection technique for a multithreaded processor.

In accordance with the invention, a multithreaded processor determines a thread identifier associated with a particular processor thread, and utilizes at least a portion of the thread identifier to select a particular portion of a register file to be accessed by the corresponding processor thread. For example, a least significant bit or other portion of the thread identifier may be utilized to select one of an even portion and an odd portion of the register file.

As a more particular example, a given general purpose register file may be configured into a plurality of even sets of registers and a plurality of odd sets of registers, with a portion of the thread identifier being utilized to enable either the plurality of even sets of registers or the plurality of odd sets of registers.

Other aspects of the invention relate to token triggered threading and pipelined instruction processing. For example, the multithreaded processor may be configured to implement token triggered threading. This type of threading utilizes a token to identify, in association with a current processor clock cycle, a particular hardware thread unit or context that will be permitted to issue an instruction for a subsequent clock cycle.

Advantageously, the invention significantly reduces the number of required register file write ports, and thus reduces processor power consumption, without any loss of processor performance. For example, in the illustrative embodiment, multiple write accesses to the register file can be achieved in a single processor cycle using only a single write port.

DETAILED DESCRIPTION OF THE INVENTION

The present invention will be illustrated herein as implemented in a multithreaded processor having associated therewith a general purpose register file. It should be understood, however, that the invention does not require the use of the particular multithreaded processor and register file configurations of the illustrative embodiment, and is more generally suitable for use in any multithreaded processor register file application in which it is desirable to provide a reduction in the number of required register file write ports and thus reduced power consumption.

An example processing system 100 which implements a thread-based register file selection technique in accordance with the invention will be described in conjunction with FIGS. 1 and 2.

Figure 1:
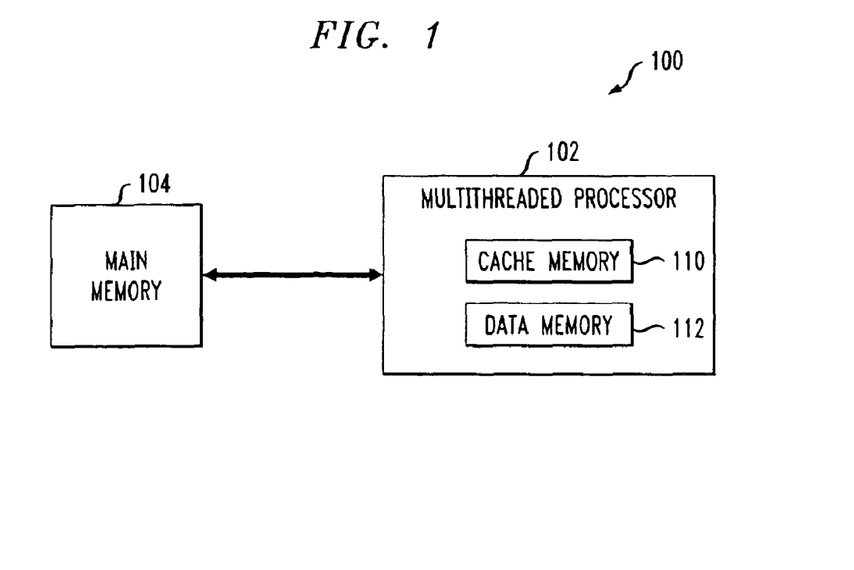
FIG. 1 is a block diagram of an example processing system in which the invention is implemented.

FIG. 1 shows the processing system 100 as including a multithreaded processor 102 coupled to a main memory 104. The multithreaded processor 102 includes a multithreaded cache memory 110 and a multithreaded data memory 112.

Figure 2:
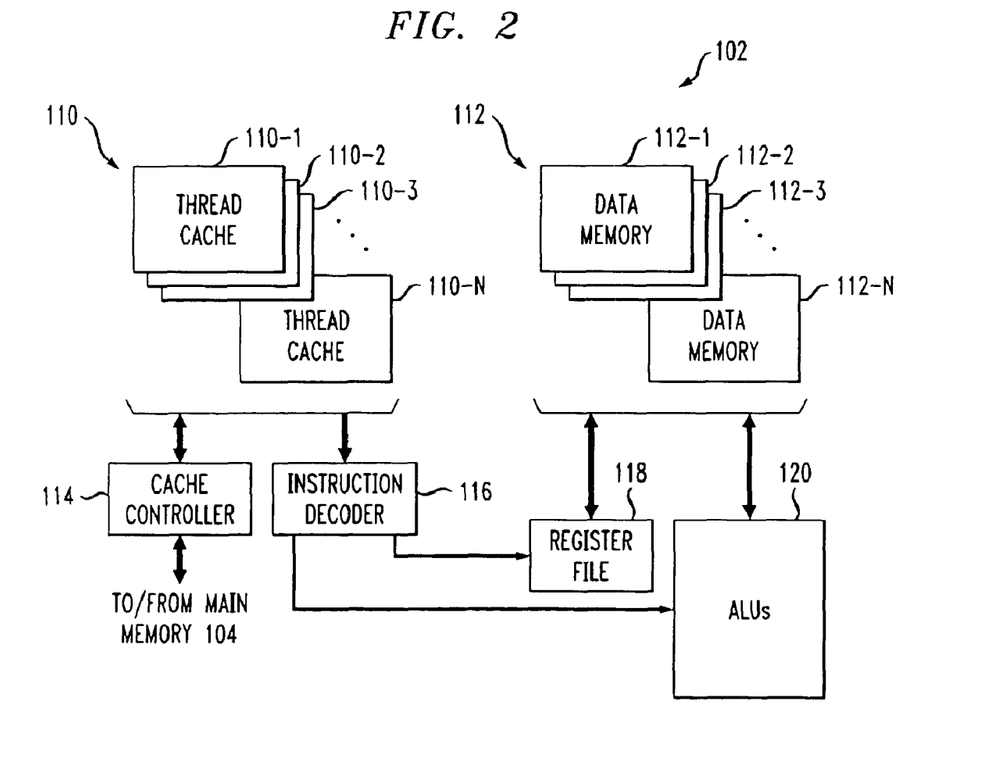
FIG. 2 is a more detailed block diagram of an illustrative embodiment of a multithreaded processor of the FIG. 1 processing system.

FIG. 2 shows a more detailed view of one possible implementation of the multithreaded processor 102. In this embodiment, the multithreaded processor 102 includes the multithreaded cache memory 110, the data memory 112, a cache controller 114, an instruction decoder 116, a register file 118, and a set of arithmetic logic units (ALUs) 120. The multithreaded cache memory 110 is also referred to herein as a multithreaded cache.

It should be noted that the particular arrangements shown in FIGS. 1 and 2 are simplified for clarity of illustration, and additional or alternative elements not explicitly shown may be included, as will be apparent to those skilled in the art.

The multithreaded cache 110 includes a plurality of thread caches 110-1, 110-2, . . . 110-N, where N generally denotes the number of threads supported by the multithreaded processor 102. Each thread thus has a corresponding thread cache associated therewith in the multithreaded cache 110. Similarly, the data memory 112 includes N distinct data memory instances, denoted data memories 112-1, 112-2, . . . 112-N as shown.

Each of the thread caches in the multithreaded cache 110 may comprise a memory array having one or more sets of memory locations. A given thread cache may further comprise a thread identifier register for storing an associated thread identifier, as will be described in greater detail below in conjunction with FIG. 7.

The multithreaded cache 110 interfaces with the main memory 104 via the cache controller 114. The cache controller 114 ensures that the appropriate instructions from main memory 104 are loaded into the multithreaded cache 110. The cache controller 114 in this illustrative embodiment, operating in conjunction with logic circuitry or other processing elements associated with the individual thread caches 110-1, 110-2, . . . 110-N, implements at least a portion of an address mapping technique, such as fully associative mapping, direct mapping or set-associative mapping. Illustrative set-associative mapping techniques suitable for use in conjunction with the present invention are described in U.S. patent application Ser. Nos. 10/161,774 and 10/161,874, both filed Jun. 4, 2002 and commonly assigned with the present application, and both of which are incorporated by reference herein.

In general, the multithreaded cache 110 is used to store instructions to be executed by the multithreaded processor 102, while the data memory 112 stores data that is operated on by the instructions. Instructions are fetched from the multithreaded cache 110 by the instruction decoder 116 which operates in conjunction with the register file 118 and the ALUs 120 in controlling the execution of the instructions in a conventional manner. The operation of multithreaded processor elements such as 116 and 120 is well-understood in the art, and therefore not described in further detail herein.

The data memory 112 is typically directly connected to the main memory 104, although this connection is not explicitly shown in the figure.

One or more of the memories 104, 110 and 112 may each be configured so as to include multiple banks or other designated portions. By way of example, each bank may be viewed as being made up of one or more memory modules, or a specified portion of a single memory module.

Techniques for thread-based banking of these and other memories associated with a multithreaded processor are described in the above-cited U.S. patent application Ser. No 10/269,247, entitled "Method and Apparatus for Thread-Based Memory Access in a Multithreaded Processor."

It should be emphasized that the present invention does not require the particular multithreaded processor configuration shown in FIG. 2. The invention can be implemented in a wide variety of other multithreaded processor configurations.

A more particular example of a multithreaded processor of the type shown in FIG. 2 and suitable for use in conjunction with the present invention is described in U.S. Provisional Application Ser. No. 60/341,289, filed Dec. 20, 2001, the conversion application thereof being the above-cited U.S. patent application Ser. No. 10/269,372, which is incorporated by reference herein. An illustrative embodiment of a multithreaded processor as described in U.S. Provisional Application Ser. No. 60/341,289, is capable of executing RISC-based control code, digital signal processor (DSP) code, Java code and network processing code. The processor includes a single instruction multiple data (SIMD) vector unit, a reduction unit, and long instruction word (LIW) compounded instruction execution.

The present invention in accordance with one aspect thereof provides a substantial reduction in the register file port requirements of a multithreaded processor such as processor 102 of FIG. 2. More specifically, as will be described in greater detail below, the processor 102 is configured in accordance with the techniques of the invention to utilize a thread-based partitioning of the register file in conjunction with token triggered threading and instruction pipelining to reduce the register file port requirements. Among other advantages, this configuration allows multiple simultaneous writes to be supported by a single register file write port.

Figure 3:
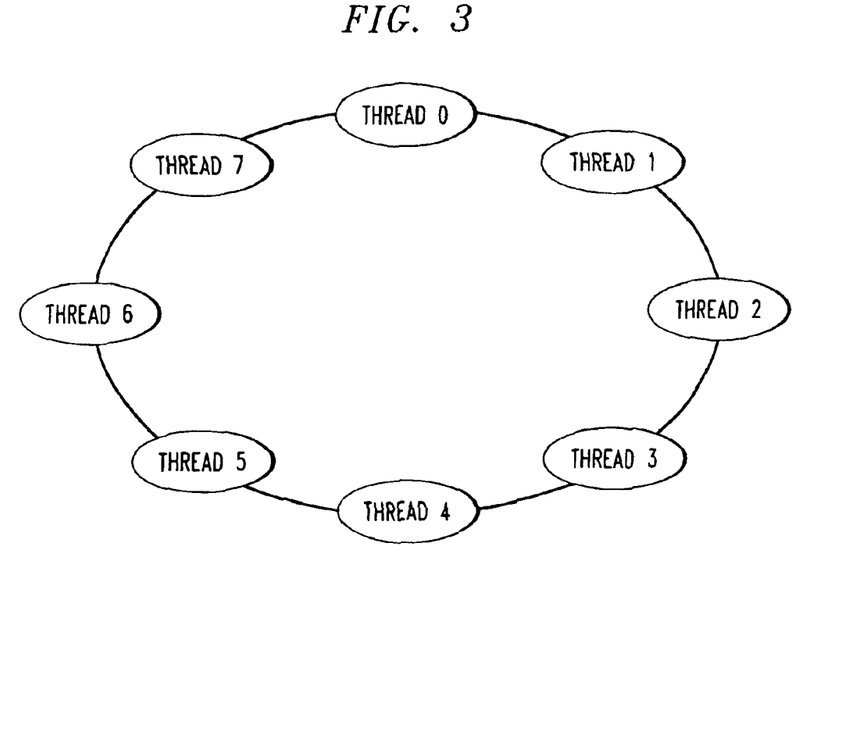
FIG. 3 illustrates an example of token triggered threading suitable for use in the multithreaded processor of FIG. 2 in accordance with the techniques of the invention.

FIG. 3 shows an example of token triggered threading for an implementation of processor 102 in which the number of threads N is eight. In general, all of the threads operate simultaneously, and each accesses a corresponding instance of the thread cache 110 and data memory 112. As shown in FIG. 3, the eight threads are denoted Thread 0, Thread 1, Thread 2, . . . Thread 7, and are illustrated as being serially interconnected in the form of a ring. In the multithreaded processor, a given thread can generally be viewed in terms of hardware as well as software. The particular processor hardware associated with a given thread is therefore more particularly referred to herein as a hardware thread unit or simply a "context."

In accordance with the token triggered threading illustrated in FIG. 3, all of the hardware thread units or contexts are permitted to simultaneously execute instructions, but only one context may issue an instruction in a particular clock cycle of the processor. In other words, all contexts execute simultaneously but only one context is active on a particular clock cycle. Therefore, if there are a total of C contexts it will require C clock cycles to issue an instruction from all contexts. Each clock cycle, one of the contexts issues an instruction, and the next thread to issue an instruction is indicated by a token. In the FIG. 3 example, the tokens are arranged in a sequential or round-robin manner, such that the contexts will issue instructions sequentially. However, tokens indicating the next context to issue an instruction may be arranged using other patterns, such as an alternating even-odd pattern. Also, as noted above, other types of threading may be used in conjunction with the present invention.

Figure 4:
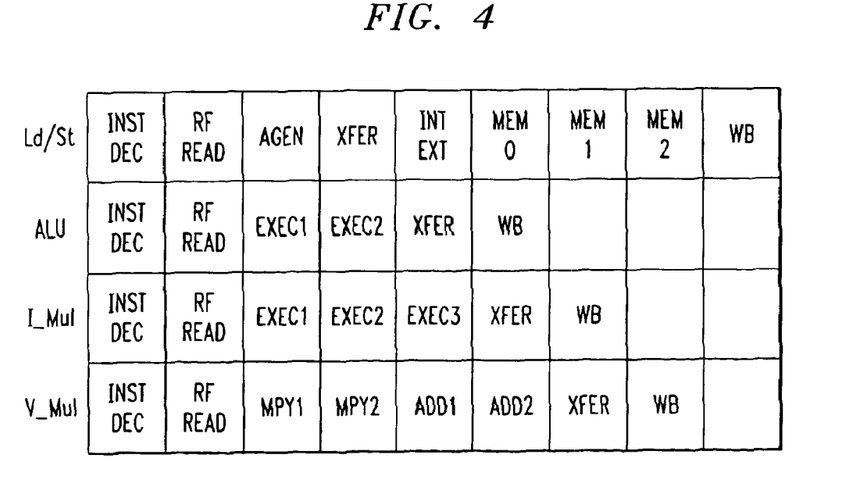
FIG. 4 illustrates the manner in which example instruction functions may be pipelined in the FIG. 2 multithreaded processor in accordance with the techniques of the invention.

FIG. 4 illustrates the manner in which example instruction functions may be pipelined in the multithreaded processor 102 in accordance with the present invention. In the illustrative embodiment of the invention, this type of pipelining is preferably utilized in conjunction with the token triggered threading described previously, but it is to be appreciated that numerous other combinations of pipelining and threading may be used in implementing the invention.

The FIG. 4 pipeline is configured for use in conjunction with the illustrative N=8 token triggered threading of FIG. 3. The example instruction functions in FIG. 4 include Load/Store (Ld/St), ALU, integer multiplication (I_Mul) and vector multiplication (V_Mul), and are shown as having nine, six, seven and eight pipeline stages, respectively.

Each of the example instruction pipelines illustrated in FIG. 4 includes at least an instruction decode stage, a register file (RF) read stage, a transfer (Xfer) stage and a writeback (WB) stage. The RF read stage involves reading from a register file, e.g., the register file 118, the transfer stage typically involves transferring instruction results to a designated holding register, and the WB stage involves writing instruction results back to memory or a register file.

The Ld/St pipeline further includes an address generation (Agen) stage, an internal (Int) or external (Ext) determination stage, and three additional memory execute stages, denoted Mem0, Mem1 and Mem2. The Ld/St pipeline thus includes a total of four memory execute stages, that is, Mem0, Mem1, Mem2 and WB. The internal or external determination stage determines if the associated memory access is to an internal or an external memory, and may be viewed as an additional decode stage within the pipeline. It should be noted that additional memory execute stages may be required for certain external memory accesses. For example, if the WB stage of an external memory access does not complete during the period of time for which the corresponding thread is active, the thread may be stalled such that the WB stage will complete the next time the thread is active.

The ALU pipeline further includes two execution stages denoted Exec1 and Exec2.

The integer I_Mul pipeline further includes three execution stages denoted Exec1, Exec2 and Exec3.

The vector V_Mul pipeline further includes two multiplication stages MPY1 and MPY2, and two addition stages Add1 and Add2.

The multithreaded processor 102 is preferably configured such that once an instruction from a particular context enters its corresponding pipeline, it runs to completion.

With an appropriately-configured pipeline and a sufficient number of threads, all hardware contexts may be executing concurrently even though there is only a single instruction issued per context per cycle. As indicated previously, the particular number of threads and pipeline stages are for purposes of illustration only, and not intended to reflect a preferred implementation. Those skilled in the art will be readily able to determine an appropriate number of threads and pipeline stages for a particular application given the teachings provided herein.

A number of examples of the operation of the pipeline of FIG. 4 will now be described with reference to FIGS. 5 and 6. The drawings of FIGS. 5 and 6 each show sequences of instructions issued by particular processor threads, and indicate for each instruction whether an even (e) portion or an odd (o) portion of the register file 118 is utilized by the corresponding thread. FIG. 7 shows an example of how the register file 118 may be separated into even and odd portions, with a particular one of the portions being selectable utilizing a thread identifier, in accordance with the techniques of the invention.

Figure 5:
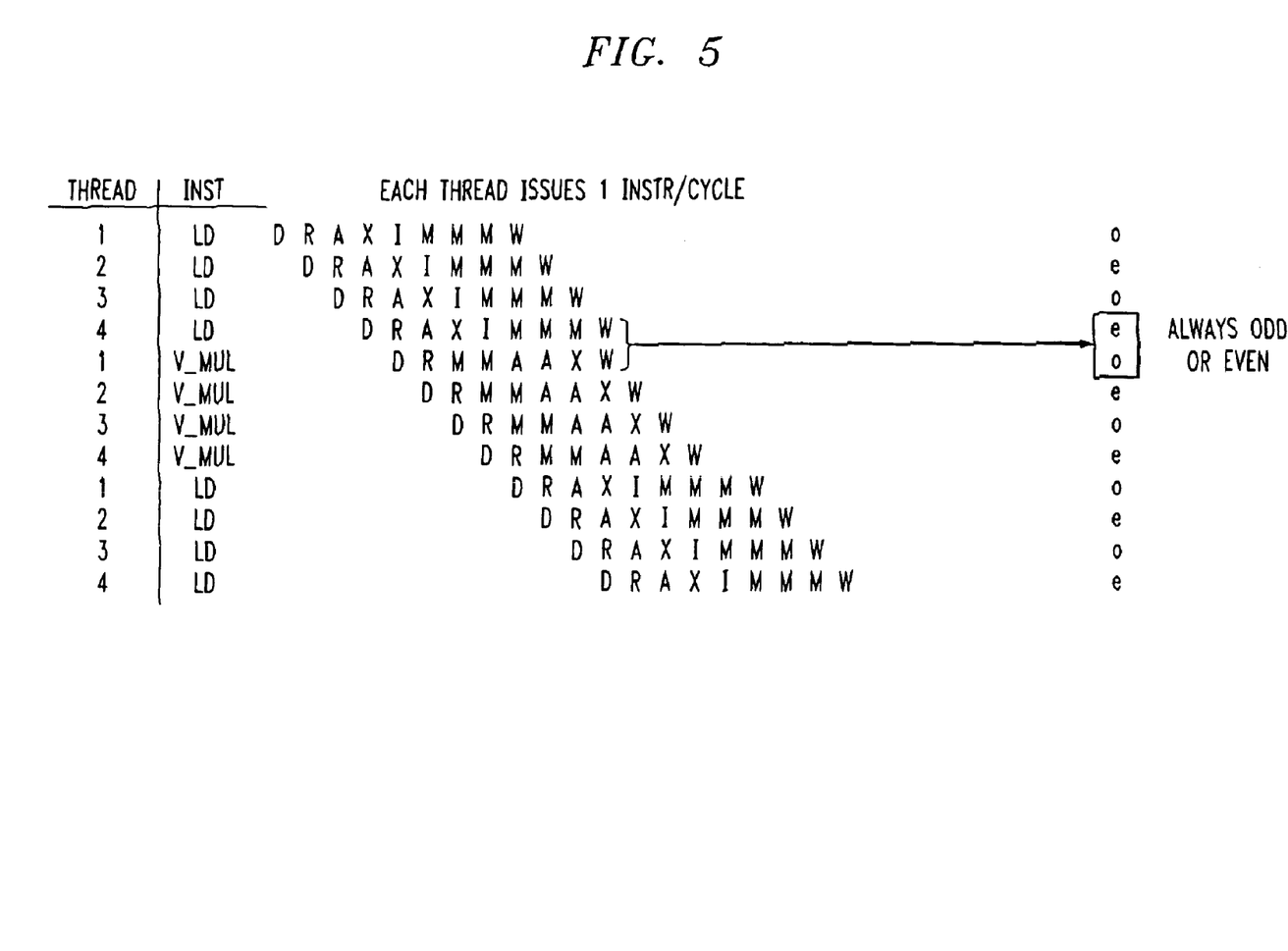
FIG. 5 shows an example single issue pipeline in which each of the threads of the FIG. 2 processor issues one instruction per cycle.
Figure 6:
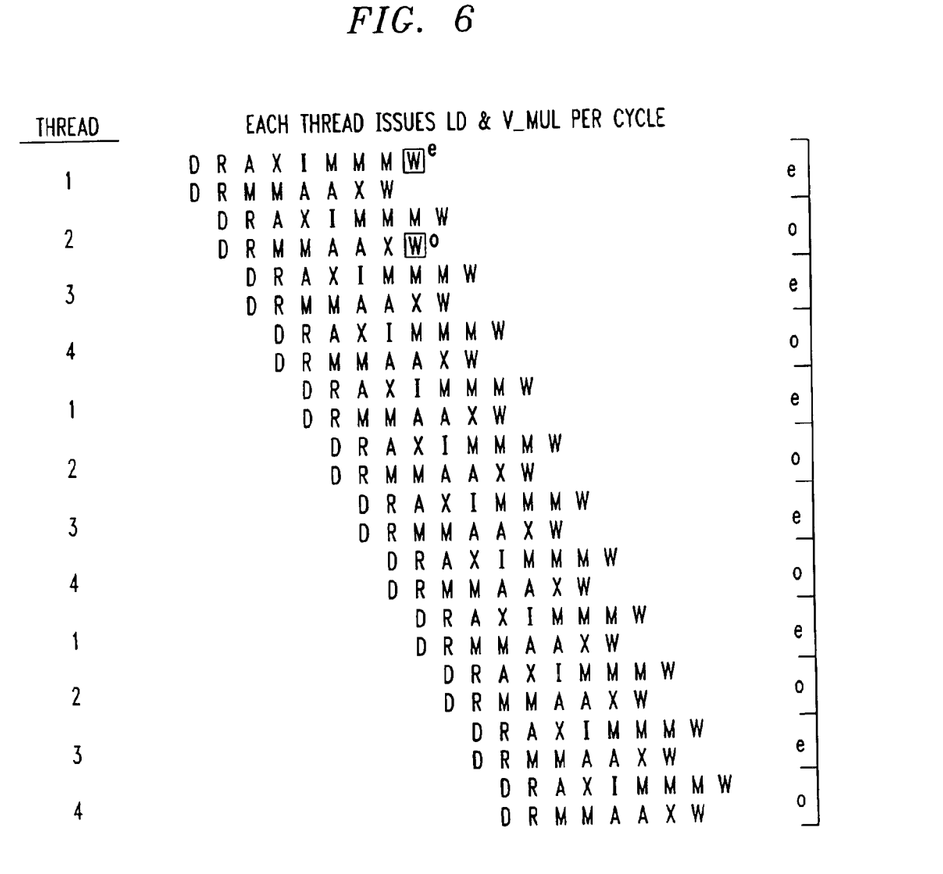
FIG. 6 shows an example multiple issue pipeline in which each of the threads of the FIG. 2 processor issues two instructions per cycle.
Figure 7:
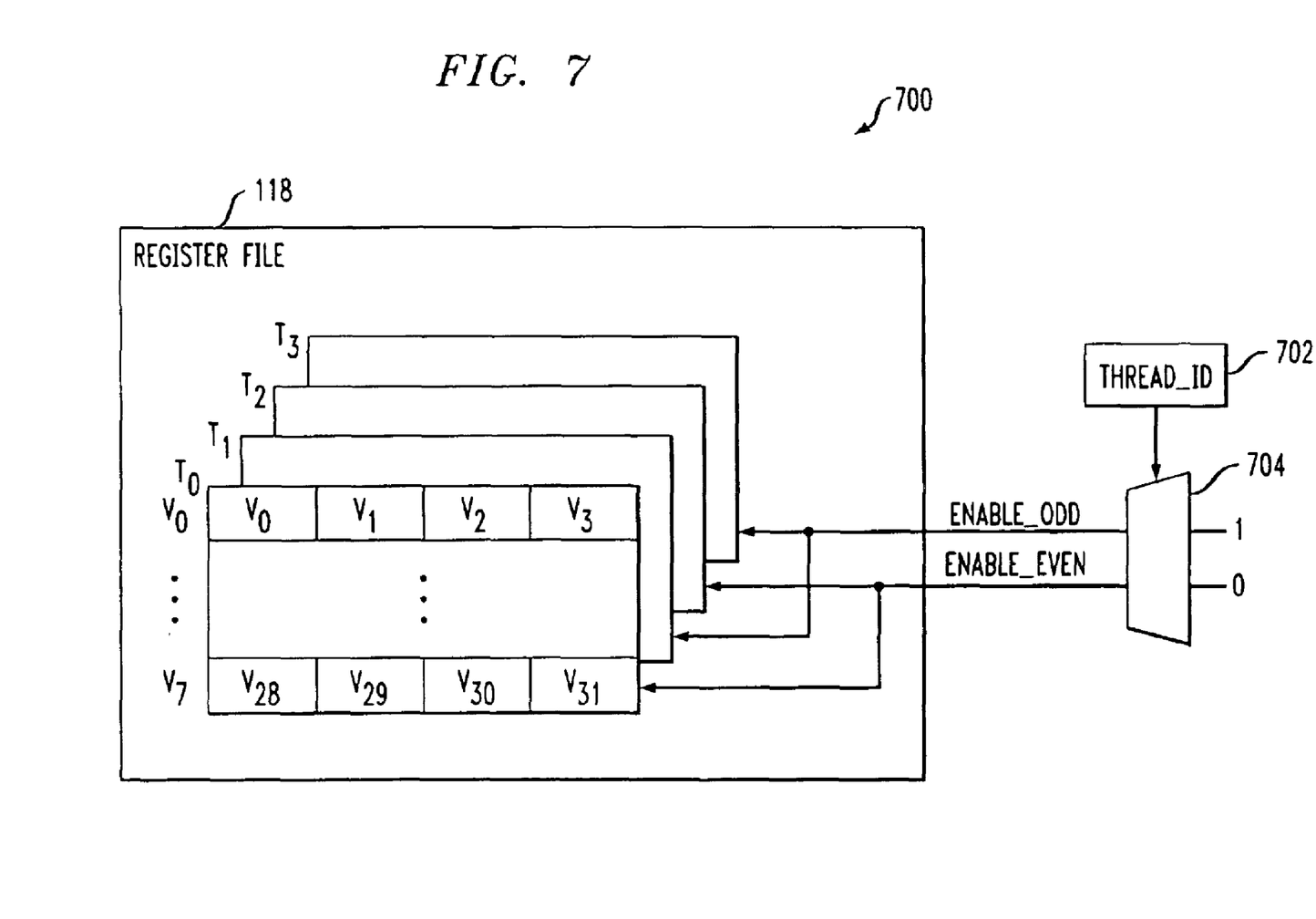
FIG. 7 shows a register file of the FIG. 2 processor configured in accordance with a thread-based register file selection technique of the present invention.

In the examples of FIGS. 5 and 6, it is assumed for simplicity and clarity of description that the number of threads N is equal to 4, and that each thread issues instructions in accordance with a round-robin implementation of the FIG. 3 token triggered threading. More specifically, each thread in these examples issues alternating Load and Vector Multiply instructions, which is a typical instruction sequence in many signal processing applications. The Load and Vector Multiply instructions are configured substantially as described in accordance with the instruction function pipeline shown in FIG. 4.

Referring now to FIG. 5, an example of a single issue pipeline is shown, in which each thread issues one instruction per cycle. It can be seen from the FIG. 5 diagram that the register file portions accessed by the issued instructions alternate from thread to thread between even (e) and odd (o). This ensures that adjacent register writeback operations, such as those associated with the writeback stages of the first Load instruction of Thread 4 and the Vector Multiply instruction of Thread 1, are directed to different portions of the register file. More specifically, the first Load instruction of Thread 4 is directed to an even portion of the register file, while the Vector Multiply instruction of Thread 1 is directed to an odd portion of the register file. The other instructions shown in the diagram are similarly configured.

As will be described in conjunction with FIG. 7, the thread identifier is used to select whether the even portion or the odd portion of the register file will be accessed by a given thread. For example, in the N=4 case of FIGS. 5 and 6, the least significant bit (LSB) of the thread identifier can be used to select between the even and odd portions of the register file.

FIG. 6 shows an example multiple issue pipeline in which each of the processor threads issues two instructions per cycle. Here, a single thread is issuing both Load and Vector Multiply instructions each cycle. Because multiple instructions issue per cycle, two additional register file read ports are required relative to the FIG. 5 example. However, as can be seen in the diagram, all concurrent writes are still to even or odd portions of the register file, as determined based on the LSB of the thread identifier, so the number of required register file write ports and thus the processor power consumption are reduced.

It should be emphasized that the particular number of threads shown in conjunction with FIGS. 5 and 6 is by way of example only, and the invention is not limited to use with any particular thread number.

FIG. 7 illustrates the manner in which the register file 118 of the multithreaded processor 102 is configured in accordance with the above-described thread-based register file selection technique of the present invention. The register file 118 is shown as being associated with processor circuitry 700 which further includes a thread identifier register 702 and selection circuitry 704. In this embodiment, the register file 118, which may be a general-purpose register file or other type of register file associated with processor 102, is configured into a number of even sets of registers and a number of odd sets of registers. More specifically, the register file 118 is divided into an even portion comprising even register sets $T_0$ and $T_2$, and an odd portion comprising odd register sets $T_1$ and $T_3$.

Each of the register sets $T_0$, $T_1$, $T_2$ and $T_3$ corresponds generally to one of four threads in an N=4 embodiment, and includes eight vector registers $V_0$, $V_1$, $V_2$ ... $V_7$ as shown. Each of the eight vector registers $V_0$, $V_1$, $V_2$ ... $V_7$ includes in this illustrative example four vector elements of, e.g., 40 bits each. For example, the vector register $V_7$ in register set $T_0$ includes four vector elements denoted $V_{28}$, $V_{29}$, $V_{30}$ and $V_{31}$. Of course, this particular arrangement is provided by way of example only, and numerous other configurations could be used.

A portion of the thread identifier, as stored in the thread identifier register 702, is utilized to enable either the even sets of registers or the odd sets of registers. The selection circuitry 704 comprises a multiplexer which drives one of its enable_even and enable_odd outputs to a logic high level while the other is driven to a logic low level, based on the thread identifier.

A register file configuration similar to that illustrated in FIG. 7 can also be used with other values of N. For example, this configuration may be used in an N=8 embodiment, with an additional bit of the thread identifier being utilized in the selection process.

The above-described arrangement allows the register file 118 to include a significantly reduced number of write ports, and thus lower power consumption, than that which would otherwise be required using conventional techniques. In the particular arrangement shown in FIG. 7, and for a four-thread implementation, each of the even and odd portions of the register file can be configured utilizing only a single write port.

Numerous alternative register file configurations are possible using the techniques of the invention. For example, one possible alternative configuration is to separate the register file into more than two portions, in which case additional bits of the thread identifier may be used to select a particular portion of the register file for access by a given processor thread. More generally, n least significant bits of the thread identifier may be used to select one of $2^n$ distinct portions of a given register file.

Another possible alternative configuration is to separate a single register into at least even and odd portions, with thread-based selection of the even or odd portion. More generally, a single register may be separated into $2^n$ distinct portions.

The term "register file" as used herein is therefore intended to include any arrangement of one or more registers. A given register file may therefore comprise, by way of example and without limitation, one or more general purpose registers, auxiliary registers, branch registers, program registers, etc. as well as portions or combinations thereof.

The thread identifier register 702 and the associated selection circuitry 704 are preferably implemented as elements of the multithreaded processor 102. For example, these elements may be implemented in whole or in part in the cache controller 114, or in another portion of the multithreaded processor 102.

The thread identifier register 702 stores a multi-bit thread identifier that is used by the multithreaded processor 102 to identify a particular thread. Such thread identifiers may be generated in a conventional manner, as will be apparent to those skilled in the art.

The term "thread identifier" as used herein is intended to include any information suitable for identifying a particular thread or a set of multiple threads in a multithreaded processor. By way of example and without limitation, the thread identifier may correspond to the output of a thread counter in a multithreaded processor. More particularly, a given multithreaded processor may be configured such that multiple threads are processed in a predetermined order, such as a round robin order, with the thread counter output being used to identify the particular thread being executed. In such an embodiment, there may be a total of eight threads that are processed in round robin order, as illustrated in FIG. 3, with each thread being identified by a three-bit identifier, such that the output of a three-bit counter can be used to identify the particular thread being processed. Other embodiments may use a non-counter implementation of the thread identifier. A wide variety of different thread identifier configurations suitable for use with the present invention will be readily apparent to those skilled in the art.

As indicated above, the thread-based register file selection techniques of the present invention provide significant improvements relative to conventional techniques. For example, the techniques can substantially reduce the number of required register file write ports, thereby reducing power consumption. Moreover, these improvements are provided without impacting processor concurrency or other aspects of processor performance.

The above-described embodiments of the invention are intended to be illustrative only, and numerous alternative embodiments within the scope of the appended claims will be apparent to those skilled in the art. For example, as indicated previously, a given register file can be divided into more than just an even portion and an odd portion as in FIGS. 5, 6 and 7, that is, it can be divided into n distinct portions, with an appropriate increase in the number of thread identifier bits used to select a given portion. As another example, the particular selection circuitry arrangements used to implement the selection process can be replaced with alternative arrangements. Moreover, the multithreaded processor configuration, the number of threads, the thread identifier configuration and other parameters of the illustrative embodiments can be varied to accommodate the specific needs of a given application.

What is claimed is:

1. A method for accessing a register file associated with a multithreaded processor, the multithreaded processor having a cache memory, the method comprising the steps of:

determining a thread identifier associated with a particular thread of the multithreaded processor; and utilizing at least a portion of the thread identifier to select a particular portion of the register file to be accessed by the corresponding processor thread;

wherein the register file is not implemented in the form of a cache and is separate from the cache memory of the multithreaded processor; and wherein the register file is separated into portions without assigning sole use of any particular one of the portions to any single thread, such that a given one of the portions is accessed by at least two of the threads, the at least two threads alternating access to the given portion of the register file over a plurality of processor clock cycles.

2. The method of claim 1 wherein the utilizing step further comprises the step of utilizing a portion of the thread identifier to select one of an even portion and an odd portion of the register file for access by the corresponding processor thread.

3. The method of claim 2 wherein the portion of the thread identifier comprises one or more least significant bits of the thread identifier.

4. The method of claim 1 wherein the portion of the thread identifier is applied to selection circuitry which generates enable signals for particular portions of the register file.

5. The method of claim 1 wherein the register file comprises $2^n$ distinct portions, and n least significant bits of the thread identifier are utilized to select one of the $2^n$ distinct portions of the register file for access by the corresponding processor thread.

6. The method of claim 1 wherein the register file comprises a general-purpose register file.

7. The method of claim 1 wherein the multithreaded processor comprises a thread identifier register for storing the thread identifier.

8. The method of claim 7 wherein the thread identifier register is associated with a thread cache corresponding to the particular thread of the multithreaded processor.

9. The method of claim 1 wherein the multithreaded processor is configured to utilize token triggered threading.

10. The method of claim 9 wherein the token triggered threading utilizes a token to identify in association with a current processor clock cycle a particular context that will be permitted to issue an instruction for a subsequent clock cycle.

11. The method of claim 9 wherein the token triggered threading assigns different tokens to each of a plurality of threads of the multithreaded processor.

12. The method of claim 1 wherein the multithreaded processor is configured for pipelined instruction processing.

13. The method of claim 12 wherein the multithreaded processor utilizes an instruction pipeline in which each thread issues a single instruction per processor clock cycle.

14. The method of claim 12 wherein the multithreaded processor utilizes an instruction pipeline in which each thread issues multiple instructions per processor clock cycle.

15. The method of claim 1 wherein the register file comprises a single register.

16. The method of claim 1 wherein the register file comprises a plurality of registers.

17. A method for accessing a register file associated with a multithreaded processor, the method comprising the steps of:

determining a thread identifier associated with a particular thread of the multithreaded processor; and utilizing at least a portion of the thread identifier to select a particular portion of the register file to be accessed by the corresponding processor thread;

wherein the register file comprises a plurality of even sets of registers and a plurality of odd sets of registers, and the utilizing step further comprises enabling either the plurality of even sets of registers or the plurality of odd sets of registers for access by the corresponding processor thread; and wherein the register file is separated into even and odd portions without assigning sole use of any particular one of the portions to any single thread, such that a given one of the portions is accessed by at least two of the threads, the at least two threads alternating access to the given portion of the register file over a plurality of processor clock cycles.

18. A method for accessing a register file associated with a multithreaded processor, the method comprising the steps of:

determining a thread identifier associated with a particular thread of the multithreaded processor; and utilizing at least a portion of the thread identifier to select a particular portion of the register file to be accessed by the corresponding processor thread;

wherein the multithreaded processor is configured for pipelined instruction processing;

wherein the multithreaded processor utilizes an instruction pipeline in which each thread issues multiple instructions per processor clock cycle; and wherein each of a plurality of the threads issues both a load instruction and a vector multiply instruction in each of a corresponding plurality of processor clock cycles without stalling of any of the plurality of threads.

19. A multithreaded processor having an associated register file comprising at least first and second portions, the multithreaded processor further having a cache memory, the multithreaded processor being operative to determine a thread identifier associated with a particular thread of the multithreaded processor, and to utilize at least a portion of the thread identifier to select a particular one of the portions of the register file to be accessed by the corresponding processor thread, wherein the register file is not implemented in the form of a cache and is separate from the cache memory of the multithreaded processor, and wherein the register file is separated into the portions without assigning sole use of any particular one of the portions to any single thread, such that a given one of the portions is accessed by at least two of the threads, the at least two threads altering access to the given portion of the register file over a plurality of processor clock cycles.

20. An article of manufacture comprising a machine-readable storage medium having embodied thereon program code for use in accessing a register file associated with a multithreaded processor, the multithreaded processor having a cache memory, wherein the program code when executed by the processor implements the steps of:

determining a thread identifier associated with a particular thread of the multithreaded processor; and utilizing at least a portion of the thread identifier to select a particular portion of the register file to be accessed by the corresponding processor thread;

wherein the register file is not implemented in the form of a cache and is separate from the cache memory of the multithreaded processor; and wherein the register file is separated into portions without assigning sole use of any particular one of the portions to any single thread, such that a given one of the portions is accessed by at least two of the threads, the at least two threads altering access to the liven portion of the register file over a plurality of processor clock cycles.

* * * * *

UNITED STATES PATENT AND TRADEMARK OFFICE
CERTIFICATE OF CORRECTION

PATENT NO. : 6,904,511 B2
DATED : June 7, 2005
INVENTOR(S) : E. Hokenek et al.

It is certified that error appears in the above-identified patent and that said Letters Patent is hereby corrected as shown below:

Column 10,
Lines 41 and 63, replace "altering" with -- alternating --.
Line 63, replace "liven" with -- given --.

Signed and Sealed this

Ninth Day of August, 2005

JON W. DUDAS
*Director of the United States Patent and Trademark Office*